US012020828B2

(12) United States Patent
Saffman

(10) Patent No.: US 12,020,828 B2
(45) Date of Patent: *Jun. 25, 2024

(54) SYSTEM AND METHOD FOR CONTROLLING PARTICLES USING PROJECTED LIGHT

(71) Applicant: WISCONSIN ALUMNI RESEARCH FOUNDATION, Madison, WI (US)

(72) Inventor: Mark Saffman, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/420,542

(22) PCT Filed: Jan. 3, 2020

(86) PCT No.: PCT/US2020/012228

§ 371 (c)(1),
(2) Date: Jul. 2, 2021

(87) PCT Pub. No.: WO2020/142718

PCT Pub. Date: Jul. 9, 2020

(65) Prior Publication Data

US 2022/0076857 A1 Mar. 10, 2022

Related U.S. Application Data

(63) Continuation of application No. 16/239,997, filed on Jan. 4, 2019, now Pat. No. 10,559,392.

(51) Int. Cl.
*G21K 1/00* (2006.01)

(52) U.S. Cl.
CPC .................................... *G21K 1/006* (2013.01)

(58) Field of Classification Search
CPC ........... G21K 1/006; G04F 5/14; G06N 10/00
See application file for complete search history.

(56) References Cited

U.S. PATENT DOCUMENTS 4,893,886 A * 1/1990 Ashkin .................. G01N 15/10
359/350
6,055,106 A * 4/2000 Grier ........................ H05H 3/04
359/566

(Continued)

FOREIGN PATENT DOCUMENTS

JP H11216580 A 8/1998
JP 2004290985 A 10/2004

OTHER PUBLICATIONS

Barredo, D., et al., An atom-by-atom assemble of defect-free arbitrary two-dimensional atomic arrays, Science 354, 1021 (2016).

(Continued)

*Primary Examiner* — David A Vanore
(74) *Attorney, Agent, or Firm* — Quarles & Brady, LLP

(57) ABSTRACT

A system and method for controlling particles using projected light are provided. In some aspects, the method includes generating a beam of light using an optical source, and directing the beam of light to a beam filter comprising a first mask, a first lens, a second mask, and a second lens. The method also includes forming an optical pattern using the beam filter, and projecting the optical pattern on a plurality of particles to control their locations in space.

20 Claims, 10 Drawing Sheets

(56) References Cited

U.S. PATENT DOCUMENTS

| | | | | |
|---|---|---|---|---|
| 7,609,391 | B2 | 10/2009 | Betzig | |
| 8,174,742 | B2 | 5/2012 | Roichman et al. | |
| 9,355,750 | B2 * | 5/2016 | Saffman | G21K 1/006 |
| 10,559,392 | B1 * | 2/2020 | Saffman | G04F 5/14 |
| 11,555,977 | B2 * | 1/2023 | Corey | G02B 7/023 |
| 11,575,860 | B2 * | 2/2023 | Saffman | G06N 10/40 |
| 11,586,968 | B2 * | 2/2023 | King | G06N 10/20 |
| 11,797,873 | B2 * | 10/2023 | King | G06N 10/20 |
| 2016/0064108 | A1 * | 3/2016 | Saffman | G21K 1/006 250/251 |
| 2016/0163407 | A1 * | 6/2016 | Kotru | G04F 5/14 250/251 |
| 2018/0011303 | A1 | 1/2018 | Loy et al. | |
| 2021/0166147 | A1 * | 6/2021 | Kim | G02F 3/00 |
| 2021/0272006 | A1 * | 9/2021 | King | G06N 10/20 |
| 2021/0279628 | A1 * | 9/2021 | Noel | G06N 10/00 |
| 2021/0337171 | A1 * | 10/2021 | Saffman | G06N 10/00 |
| 2022/0262535 | A1 * | 8/2022 | Noel | G06N 10/40 |
| 2023/0282385 | A1 * | 9/2023 | Kim | G21K 1/006 250/251 |

OTHER PUBLICATIONS

Endres, M., et al., Atom-by-atom assembly of defect-free one-dimensional cold atom arrays, Science 354, 1024 (2016).

International Search Report and Written Opinion issued in corresponding PCT Application No. [US2020/012228], dated Feb. 11, 2020.

Isenhower, L., et al., Atom trapping in an interfero-metrically generated bottle beam trap, Opt. Lett. 34, 1159 (2009).

Piotrowicz, M.J., et al., Two-dimensional lattice of blue-detuned atom traps using a projected Gaussian beam array, Phys. Rev. A 88, 013420 (2013).

Pochemyaev, V.N., Integrals of products of Bessel functions for applied electrodynamic problems, Ukrain. Math. J. 47, 658 (1995).

Talbot, W.H.F., Facts relating to optical science, No. iv, Philos. Mag. 9, 401 (1836).

Wang, Y., et al., Single-qubit gates based on targeted phase shifts in a 3D neutral atom array, Science 352, 1562 (2016).

Wen, J., et al., The Talbot effect: recent advances in classical optics, nonlinear optics, and quantum optics, Adv. Opt. Phot. 5, 83 (2013).

Liang, et al., "Evaluation of DMD-based high-precision beam shaper using sinusoidal-flattop beam profile generation" Proc. SPIE 8130, Laser Beam Shaping XII, 81300C (Sep. 7, 2011); https://doi.org/10.1117/12.892840.

* cited by examiner

SYSTEM AND METHOD FOR CONTROLLING PARTICLES USING PROJECTED LIGHT

STATEMENT REGARDING FEDERALLY SPONSORED RESEARCH

This invention was made with government support under W911NF-15-2-0061 awarded by the ARMY/ARL and 1720220 awarded by the National Science Foundation. The government has certain rights in the invention.

CROSS REFERENCE TO RELATED APPLICATIONS

This application is a national stage filing under 35 U.S.C. 071 of International Application No. PCT/US2020/012228, filed Jan. 3, 2020, which claims priority to U.S. patent application Ser. No. 16/239,997, filed on Jan. 4, 2019, now U.S. Pat. No. 10,559,392, granted Feb. 11, 2020, the entirety of each are incorporated by reference herein in their entirety.

BACKGROUND

The field of the disclosure is related to systems and methods for controlling particles. More particularly, the disclosure relates to systems and methods for trapping particles using projected light.

The ability to confine and manipulate particles using optical techniques has paved the way for a number of scientific advancements. For instance, defect-free artificial crystals have been created using trapped particles, and used to investigate various fundamental principles governing interactions and material properties. Neutral atoms have been particularly attractive because of their well-defined quantum structure and charge neutrality. Charge neutrality isolates atoms from charge-related perturbations, and helps to retain quantum information for longer times. In addition, neutral atoms can be controlled individually, and scaled to large systems.

An atom becomes trapped by the coherent interactions between the electromagnetic fields of applied light, and oscillating electric dipole moment induced in the atom. Specifically, the electromagnetic fields induce internal atomic energy shifts that generate effective potentials from which confinement forces arise. To trap the atom, the frequencies of the light are typically shifted, or detuned, with respect to the atomic resonance frequencies. In particular, when the frequency of the light is below an atomic transition frequency, or "red detuned," the induced atomic dipole moment is in-phase, and the atom becomes attracted to the intensity maxima of the light. The attraction strength is dependent upon the magnitude of detuning. By contrast, when the frequency is "blue detuned," the induced moment is out of phase, and the atom is repelled from the maxima. In addition, the strength of attraction/repulsion can be modified by controlling the intensity or power of the applied light.

Optical techniques have also been widely used for trapping arrays of atoms for quantum computing and atomic clock applications. Arrays have been prepared in 1-, 2-, or 3-dimensional configurations or optical lattices. Bright, red detuned, arrays localize atoms at the local maxima, while dark, blue detuned, arrays localize the atoms at local minima. In general, dark arrays require more complicated optical systems, but offer the important advantage that by localizing atoms where the intensity is low, there is less perturbation. This is significant for extending the coherence time of atomic qubits and for minimizing disturbance to atoms in optical clocks.

Optical lattices are commonly formed by the interference of light from different sources. For example, a 1D lattice can be created using a standing wave generated by superposing two counter-propagating laser beams. Higher dimensional optical lattices require additional optical sources. For example, a 3D simple-cubic lattice structure can be produced by overlapping three orthogonal standing waves formed using 3 pairs of counter-propagating optical sources. However, atomic positions in a lattice generated by the interference of counter-propagating beams are very sensitive to optical path-length. Slight drifts can cause differential phase shifts between beams, and significantly affect the atomic positions. Although phase shifts can be, in principle, compensated by using active stabilization, such techniques are commonly applied to single atoms. This is because of the increased system complexity required for performing active stabilization on multiple atoms.

The position of the interference fringes is sensitive to the relative phase of the interfering light beams, and is thus sensitive to optical path lengths. Such sensitivity may be removed by projecting intensity patterns that do not require interferometric stability. However, projected light forms more than one plane of optical traps due to the Talbot effect, which arises from the periodic nature of phase coherent light repeating in free space. This can lead to unwanted atom trapping in multiple spatial planes. In attempting to suppress this effect, some prior techniques have utilized different frequencies of light for each optical trap, or spatial light modulators to impart random phases to each trap. However, such approaches require a number of components (e.g. acousto-optic deflectors, spatial light modulators, diffractive, polarization sensitive optical components, and so on) that add significant system complexity and cost.

Given the above, there is a need for systems and methods for particle confinement that are simple to implement and avoid undesired effects, such as position drifts due to optical phase fluctuations, crosstalk, and the Talbot effect.

SUMMARY

The present disclosure overcomes the drawbacks of previous technologies by providing a system and method for controlling particles using projected light.

In one aspect of the present disclosure, a system for controlling particles using projected light is provided. The system includes a particle system configured to provide a plurality of particles, and an optical source configured to generate a beam of light with a frequency shifted from an atomic resonance of the plurality of particles. The system also includes a beam filter positioned between the particle system and plurality of particles, and comprising a first mask, a first lens, a second mask, and a second lens, wherein the optical source, beam filter, and particle system are arranged such that the beam of light from the optical source passes through the beam filter, and is projected on the plurality of particles to form an optical pattern that controls the positions of the particles in space.

In another aspect of the present disclosure, a method for controlling particles using projected light is provided. In some aspects, the method includes generating a beam of light using an optical source, and directing the beam of light to a beam filter comprising a first mask, a first lens, a second mask and a second lens. The method also includes forming an optical pattern using the beam filter, and projecting the optical pattern on a plurality of particles to control their locations in space.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Conventional particle trapping technologies generally rely on interference between mutually coherent light beams. These approaches suffer from a number of drawbacks, including sensitivity to beam misalignments, source phase drift and phase noise. By contrast, the inventors have discovered that projected light fields can be used to trap particles. As detailed in U.S. Pat. No. 9,355,750, which is incorporated herein by reference in its entirety, projected light fields can be used to overcome shortcomings of conventional technologies, and provide a number of advantages. For example, particle traps created using projected light fields are scalable, can provide deeper trap depths, and will not change position or depth in response to a source phase drift or noise. In addition, less energy is required per trapping site, thereby allowing more sites for a given energy.

In recognizing practical considerations, such as ease of implementation and cost, the present disclosure introduces a novel approach for trapping particles using light fields. In particular, the present disclosure provides a simple, low-cost, solution that enhances performance compared with previous techniques by improving trapping strength and particle localization. In addition, the present approach increases robustness and makes efficient use of light.

As appreciated from description below, the present invention can be used to improve a variety of technical fields. For example, an atomic particle array, generated in accordance with the present disclosure, can be part of a hardware configuration for a quantum computer or a quantum computation system. Additionally, atoms trapped using methods herein can also be used as atomic clocks or atomic sensors, as well as in quantum simulation applications. Other improved technical fields may include optomechanics, and small-sphere applications. For example, trapped particles (e.g. microspheres, nanospheres) may be used as probes for measuring physical quantities, or as lasers sources for optical frequency combs.

Figure 1:
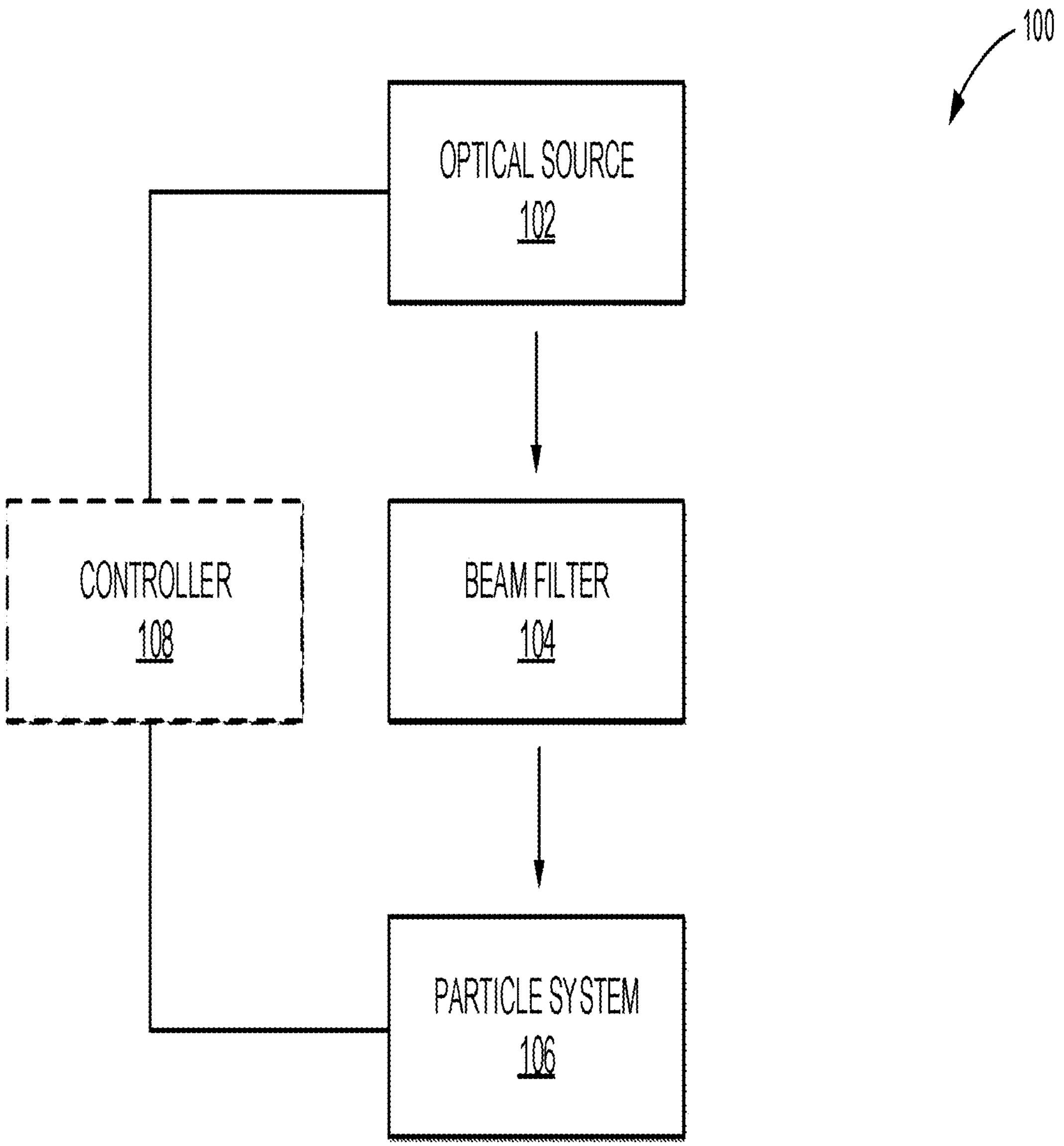
FIG. 1 is a schematic diagram of a system, in accordance with aspects of the present disclosure.

Turning now to FIG. 1, a schematic of an example system 100, in accordance with aspects of the present disclosure, is shown. In general, the system 100 may include an optical source 102, a beam filter 104, and a particle system 106. The system 100 may optionally include a controller 108 in communication with, and configured to control, the optical source 102, the light filter 104, and/or the particle system 106.

The optical source 102 may include various hardware for generating light. In particular, the optical source 102 may be configured to generate light with various frequencies, wavelengths, power levels, spatial profiles, temporal modulations (e.g. periodic or aperiodic), and so on. In some aspects, the optical source 102 may be configured to generate light fields using frequencies shifted from at least one atomic resonance. For example, the optical source 102 may be configured to generate blue-detuned or red-detuned light, where the amount of detuning may depend upon the species of particles (e.g. atomic species) to be trapped. As an example, the detuning may be in a range between approximately 10 and approximately 100 nanometers.

In one embodiment, the optical source 102 includes a laser that produces light with wavelengths in a range between approximately 500 nm and approximately 1500 nm, although other wavelengths are possible. In another embodiment, the optical source 102 includes multiple lasers operated at multiple frequencies, where the frequency separation between the lasers is configured to achieve a target coherence. The frequencies may be selected to achieve a full coherence, a partial coherence, or an incoherence between various light regions of an optical pattern. In one non-limiting example, two frequencies can be utilized, where the difference in wavelength can vary up to approximately 100 nanometers, although other values are possible. In this manner, different components forming particular light fields can be configured to be mutually incoherent.

Figure 2A:
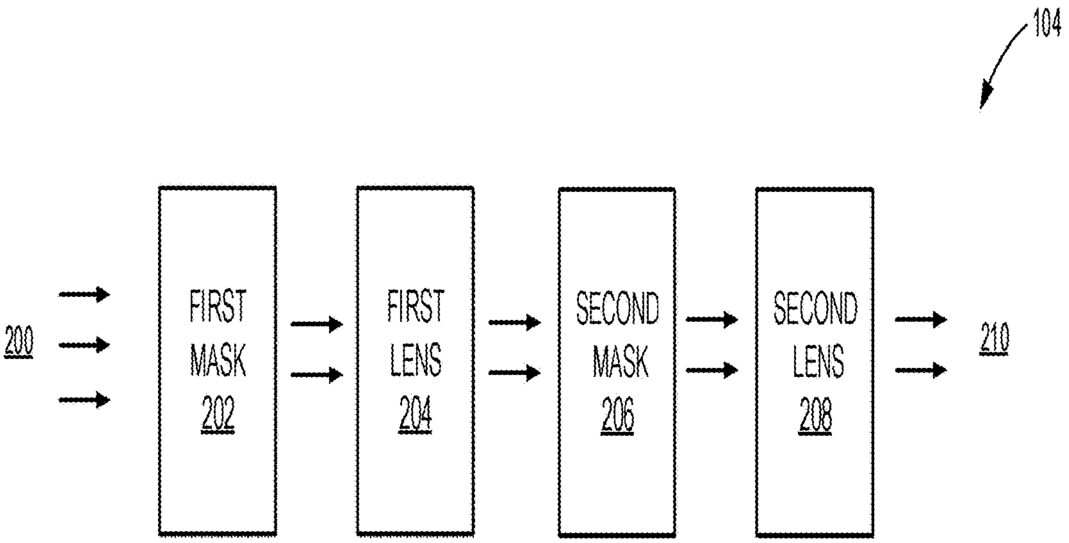
FIG. 2A is a schematic diagram of one embodiment of a beam filter, in accordance with aspects of the present disclosure.
Figure 2B:
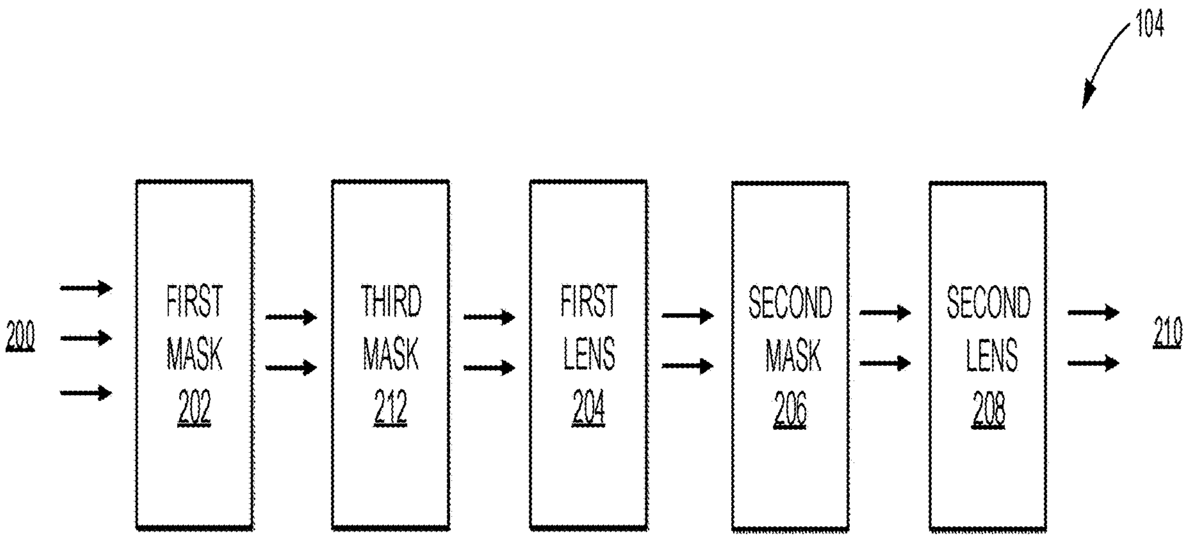
FIG. 2B is a schematic diagram of another embodiment of a beam filter, in accordance with aspects of the present disclosure.

The beam filter 104, positioned downstream from the optical source 102, is configured to control the beam(s) of light generated by the optical source 102. In particular, the beam filter 104 is configured to form an optical pattern using the generated light, which when projected upon various particles (e.g. neutral atoms), will trap the particles in space. Referring specifically to FIG. 2A, in general, the beam filter 104 may include a first mask 202, a first lens 204, a second mask 206 and a second lens 208, configured such that incident light 200 passes sequentially through the first mask 202, the first lens 204, the second mask 206, and second lens 208, thereafter exiting the beam filter 104 to form an optical pattern 210. In another variation, as shown in FIG. 2B, the beam filter 104 may further include a third mask 212 positioned between the first mask 202 and the first lens 202, where the third mask 212 may include a phase scrambling mask. The phase scrambling mask may include a number of scrambling regions, each transmitting and imparting a phase shift to light passing therethrough. In some embodiments, phase shifts provided by different phase scrambling regions are different, and distributed randomly across the phase scrambling mask over 2π To this end, the different phase scrambling regions may include different dielectric properties or layers.

In some aspects, the first mask 202 may have a variety of transmitting regions (e.g. apertures) and reflecting regions configured to generate an optical pattern that includes bright and dark regions. The bright and dark regions are configured to confine the positions of one or more particles in a desired pattern due to optically-induced trapping forces. As used herein, "bright" refers to regions of light intensity maxima, while "dark" refers to regions of light intensity minima. In some non-limiting examples, the optical pattern may include an arrangement of one or more bright spots or dark spots, respectively. For instance, the optical pattern may include an array of bright, or dark, spots arranged in a one-dimensional (1D) or a two-dimensional (2D) array. Other 1D and 2D arrangements may also be possible. For example, non-rectilinear grids, such as parallelogram, triangular, or hexagonal grids, and as well as configurations of bright and dark regions may be produced. In addition, in some embodiments, the optical pattern may include a 3D configuration that includes multiple 1D or 2D arrays of bright and/or dark regions having various desirable spatial separations between them.

Figure 3A:
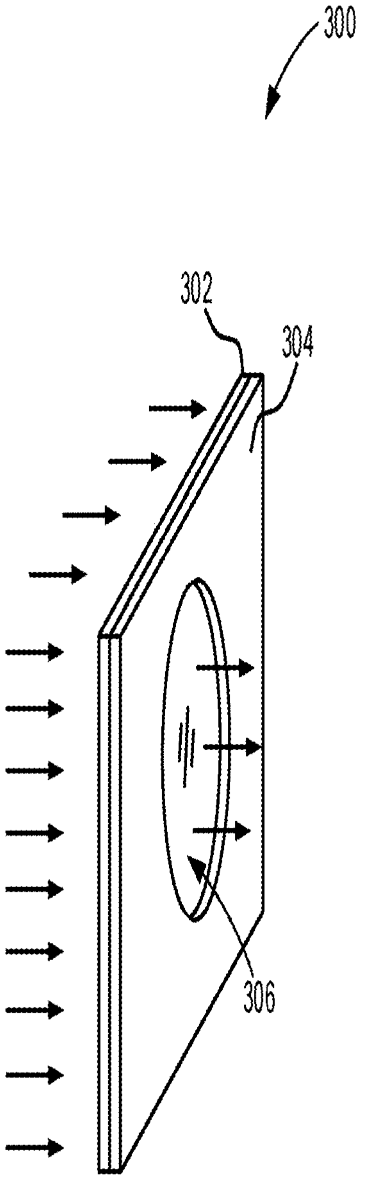
FIG. 3A is perspective view of an example mask, in accordance with aspects of the present disclosure.
Figure 3B:
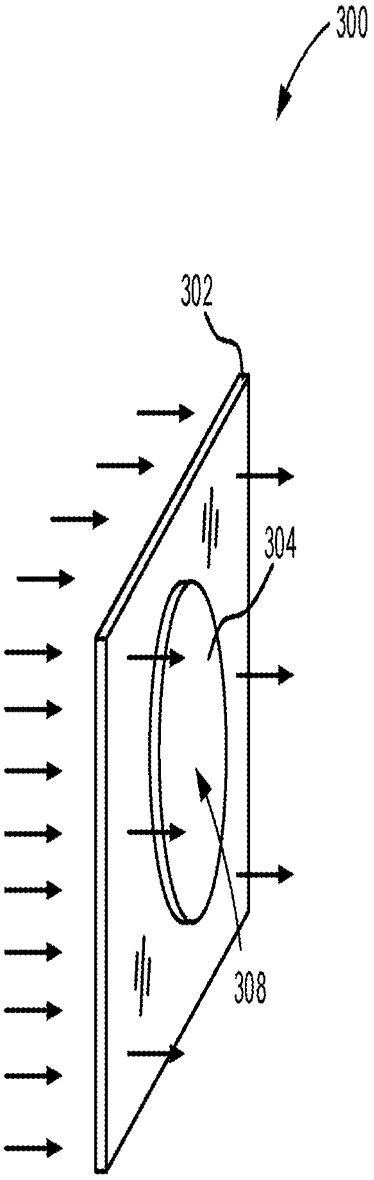
FIG. 3B is a perspective view of another example mask, in accordance with aspects of the present disclosure.

In some embodiments, the first mask 202 of the beam filter 104 may be formed using a reflecting plane 300, as shown in FIGS. 3A-3B. The reflecting plane 300 may include a substrate 302 (e.g. glass or other transparent substrate) coated with a reflective layer 304, having a predetermined reflectivity, r. As shown in FIG. 3A, the reflective layer 304 may cover a portion of the substrate 302 to form at least one aperture 306 through which light can be transmitted. In this manner, one or more bright spots may be formed when the reflecting plane 300 is exposed to light. In some variations, the aperture 306 may also extend through the substrate 302. Alternatively, the reflective layer 304 may form a reflecting region 308 on the substrate 302 so as to form at least one dark spot, as shown in FIG. 3B. Although the aperture 306 in FIG. 3A, and reflecting region 308 in FIG. 3B are shown as circular, they may have various other shapes (e.g. linear, rectangular, square, oval, and other regular or irregular shapes), numbers, dimensions, and spatial arrangements/separations, depending on the optical pattern desired.

Referring again to FIG. 1, the particle system 106 may be configured to provide and control a number of particles. Specifically, the particle system 106 may include various materials, gases and hardware configured to generate, transfer, manipulate and generally confine the particles. For example, the particle system 106 can include a vacuum system, and capabilities for generating, transferring and confining particles in the vacuum system. In some non-limiting examples, the particles may include any species of neutral atoms, such as Rb, Cs, Ho, Sr, Tb, Ca, and so on, or combinations thereof. However, systems and methods of the present invention are not limited to alkalis or atomic particles, and can be applied to any particles or molecules suitable for optical confinement. In some aspects, the particle system 106 can be configured with capabilities for cooling the particles to any desired temperatures, in order to facilitate trapping. For instance, the particle system 106 may include a laser for cooling the particles to temperatures in a range between 1 and 100 microKelvins, although other values are also possible. Alternatively, the optical source 102 may be used for this purpose. Additionally, the particle system 106 may also include various optical elements to facilitate projection of generated light fields onto the particles therein.

In some embodiments, the system 100 may also include a variety of other hardware and optical elements for directing, transmitting, modifying, focusing, dividing, modulating, and amplifying generated light fields to achieve various shapes, sizes, profiles, orientations, polarizations, and intensities, as well as any other desirable light properties. For instance, in one non-limiting example, the system 100 may include top-hat beam shaper configured to transform a Gaussian-shaped beam emitted by a laser, for example, into a uniform-intensity beam of light with sharp edges. The system 100 may also include other optical elements, such as various beam splitters, beam shapers, shapers, diffractive elements, refractive elements, gratings, mirrors, polarizers, modulators and so forth. These optical elements may be positioned between the optical source 102 and beam filter 104, and/or after the beam filter 104.

In addition, the system 100 can optionally include other capabilities, including hardware controlling or interrogating quantum states of particles configured and arranged in accordance with the present disclosure. Such capabilities facilitate applications including quantum computation, and so forth. These, along with other tasks, may optionally be performed by the controller 108 shown in FIG. 1. For instance, the controller 108 may be configured to trigger the optical source 102 to generate light. Additionally, or alternatively, the controller 108 may also be configured to control operation of the particle system 106, and its various components there.

Figure 4A:
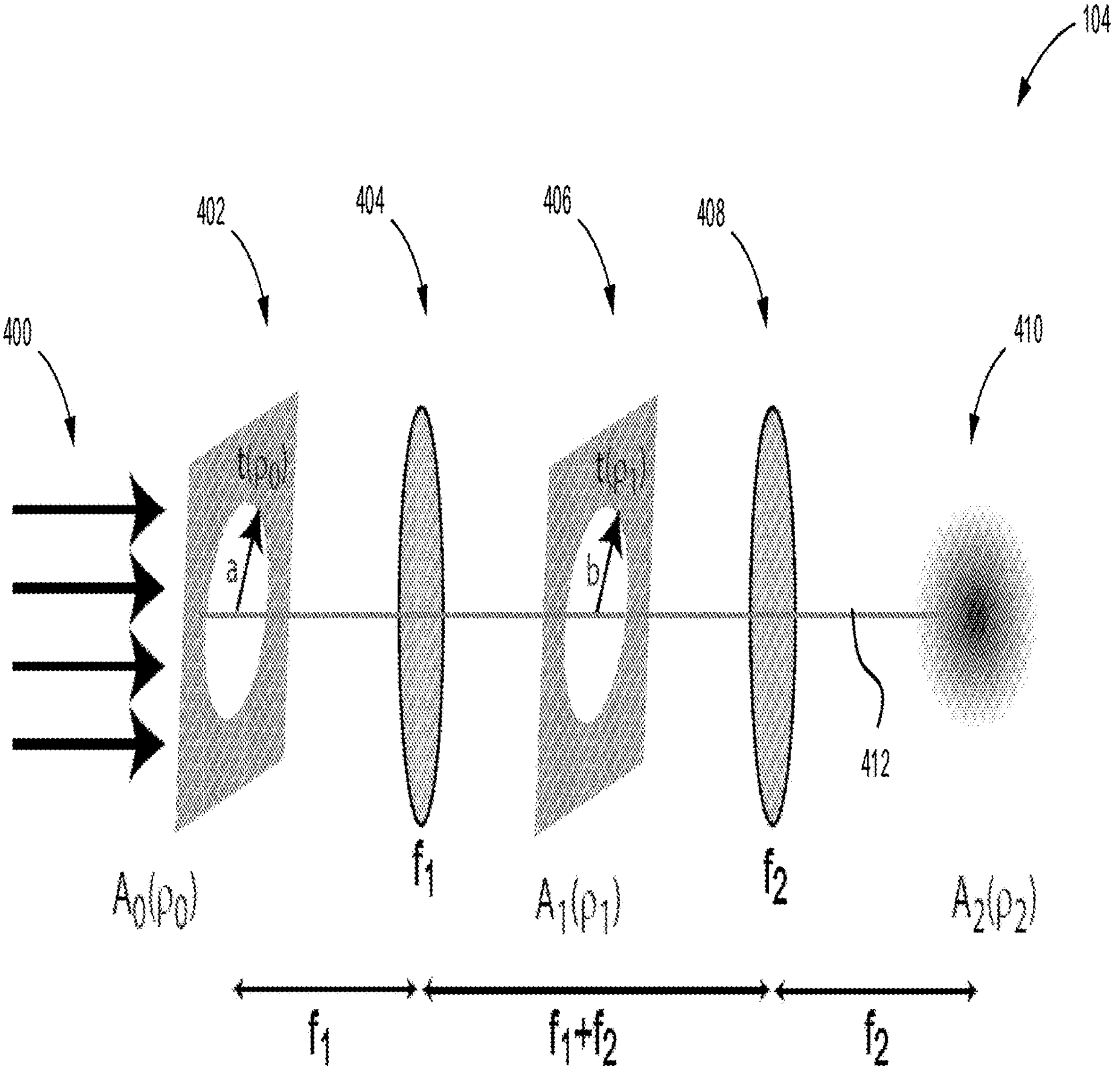
FIG. 4A is an illustration of an example beam filter, in accordance with aspects of the present disclosure.

In some embodiments, the beam filter 104 of the system 100 may be configured to generate an optical pattern using a Fourier filtering or "4f" optical arrangement. Referring specifically to FIG. 4A, the beam filter 104 may include a first mask 402 having a circular aperture with radius a, a first lens 404 with focal length $f_1$, a second mask 406 having a circular aperture with radius b, and a second lens 408 with focal length $f_2$. As shown, the first mask 402 and the second mask 406 are positioned at the focal length $f_1$ of the first lens 404. In addition, the second mask 406 is positioned at the focal length $f_2$ of the second lens. 408. When the beam filter 104 is uniformly illuminated, a portion of the input light 400 traverses through the first aperture 402, located at the input plane, and the first lens 404 produces an Airy light pattern at its back focal plane where the second mask 406 is positioned. The second mask 406 then filters the Airy light pattern, and the filtered Airy pattern is Fourier transformed by the second lens 408 to produce the optical pattern 410 at the output plane. Using standard optical diffraction theory the field at the output plane is given by:

$$A_2(\rho_2) = -A_0\frac{\alpha k}{f_2}\int_0^b d\rho_1 J_0\left(\frac{\rho_2 k}{f_2}\rho_1\right)J_i\left(\frac{\alpha k}{f_1}\rho_1\right); \tag{1}$$

where $A_0$ is the amplitude of the input light 400. The finite integral of Bessel functions in Eqn. 1 can be expressed as a power series in b using $$\int_0^b dz J_0(cz) J_1(dz) = \sum_{j=0}^{\infty} \frac{(-1)^j}{j!\,(j+1)!(2j+2)^2} F_1\left(-j, -1-j; 1; c^2/d^2\right) b^{2+2j} (d/2)^{1+2j}. \tag{2}$$

Here, ${}_2F_1$ is the hypergeometric function. In some aspects, the focal lengths and aperture of the second mask 406 may be selected as $f_1=f_2=f$, and $b=(f/ak)x_1$, where $x_1$ is 3.8317 is the first zero of $l_1$. This selection corresponds to blocking the Airy rings outside of the central lobe, resulting in only a small power loss since the integrated power in the central lobe is 0.84 of the total power $I_0\pi a^2$, with $l_0$ being the input intensity. With these selections, the output field can be expressed as a power series in $\rho_2/a$. The leading terms are $$\frac{I_2(\rho_2)}{I_0} = 1.978 - 4.147\left(\frac{\rho_2}{\alpha}\right)^2 + 3.918\left(\frac{\rho_2}{\alpha}\right)^4. \tag{3}$$

Figure 5:
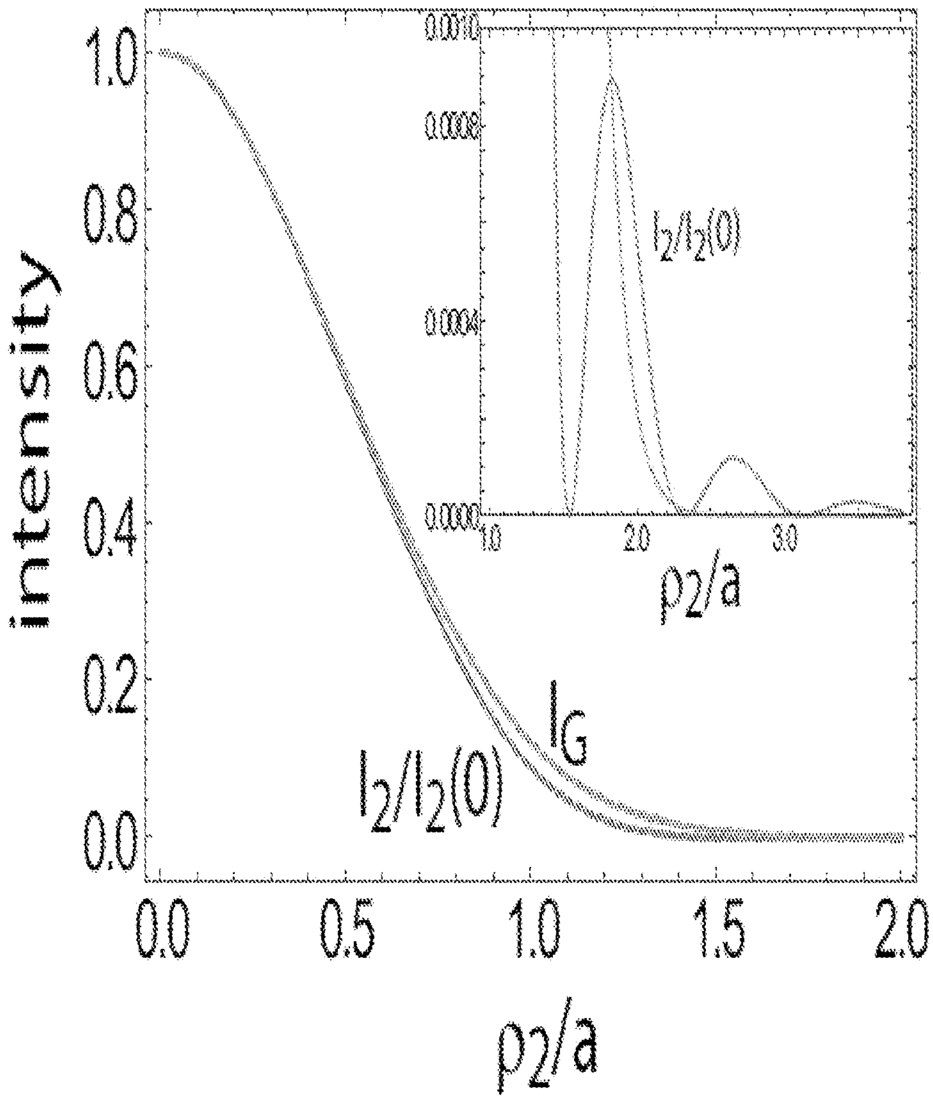
FIG. 5 is a graph comparing intensity profiles for a Gaussian beam ($I_G$) and Airy-Gauss beam ($I_2$) obtained from uniform illumination of a circular aperture, in accordance with aspects of the present disclosure.

The resulting optical pattern is referred to as an Airy-Gauss (AG) beam because the beam filter 104 filters an Airy light pattern and the intensity has a near Gaussian form. As shown in FIG. 5, the AG beam is a quadratic function of $\rho_2$ near the origin. Matching the quadratic term with that of a Gaussian intensity profile gives $I_G=e^{-2\rho_2^2/w_2}$, =0.974a. Thus, to a good approximation, Fourier filtering of a uniformly illuminated circular aperture produces a Gaussian profile with waist parameter slightly less than the aperture radius a. Although the AG beam is not a pure Gaussian, and has secondary lobes as seen in the inset of FIG. 5, the lobes are sufficiently weak that the profile remains close to that of a Gaussian after diffractive propagation. To note, time reversal symmetry implies that by propagating a Gaussian or near-Gaussian beam through a similar double aperture setup it is possible to efficiently prepare a uniform or near-uniform beam. Therefore, in some implementations, the beam filter 104 shown in FIG. 4A may also be used to prepare a uniform beam. To do so, a Gaussian or near-Gaussian beam may be propagated in reverse through the beam filter 104 (i.e. sequentially through the second lens 408, the second mask 406, the first lens 404 and first mask 402), and thereby transforming the incident beam into a beam with a uniform intensity profile and sharp edges (e.g. a top-hat beam).

Figure 4B:
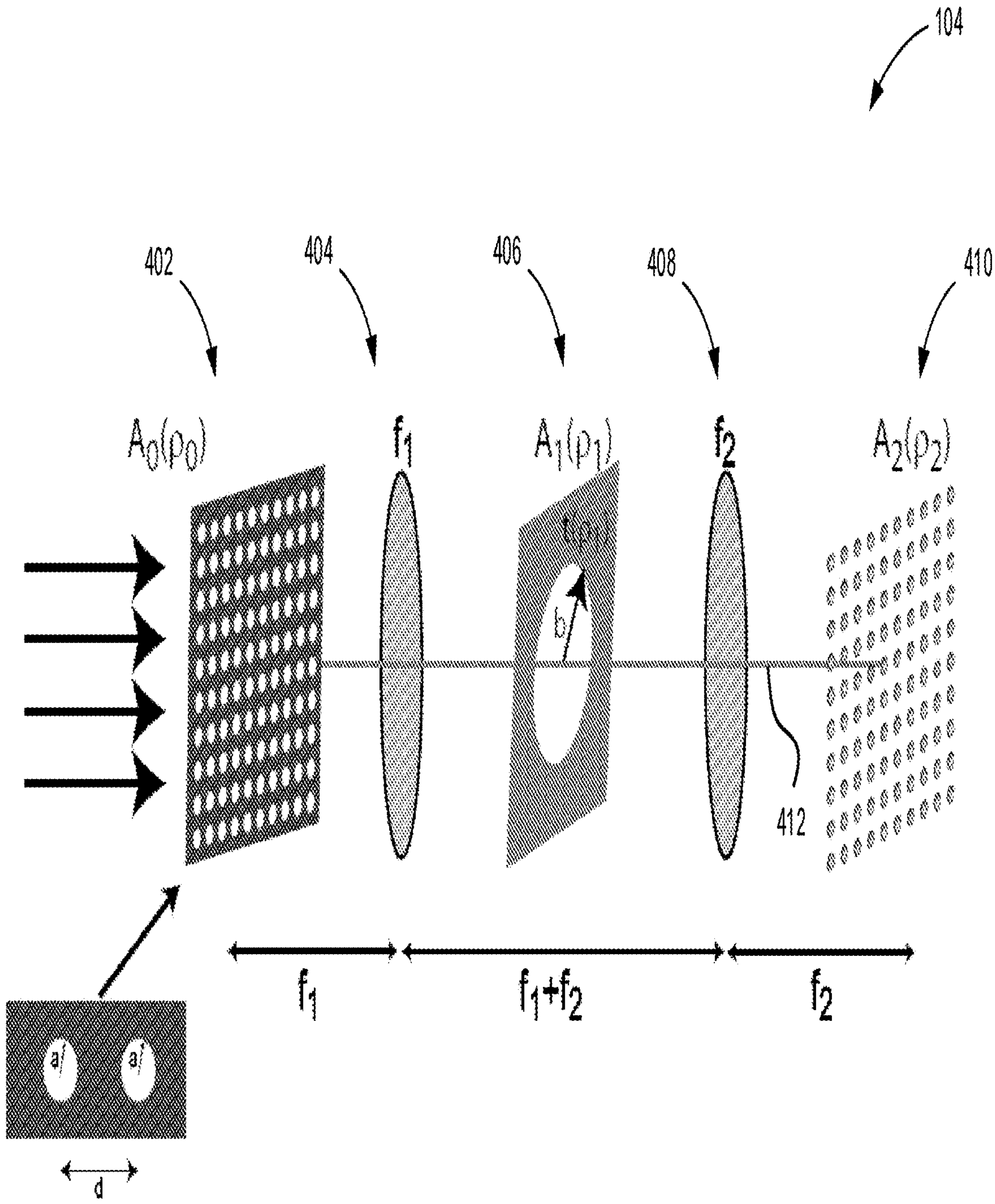
FIG. 4B is an illustration of another example beam filter, in accordance with aspects of the present disclosure.

The above-described Fourier filtering approach to beam shaping can be readily extended to create an array of Gaussian like beams. Referring specifically to FIG. 4B, in some embodiments, the first mask 402 of the beam filter 104 may include an array of apertures arranged on a two-dimensional grid with spacing d. The light field transmitted through each aperture of the first mask 402 have the form given by Eqn. 1, and appear at position $-\rho_{ij}$ in the output plane, where pi j is the position of the $ij^{th}$ aperture relative to axis 412 of the first mask 402. Provided that the spacing satisfies the relation $d \gtrsim 3a$, the interference between adjacent beams can be negligible. In some aspects, the array of bright spots at the output plane can be reimaged with any desired magnification to create an array of beams with spacing given by $d_{out}=(df_2/f_1)\times M$, where M the magnification of the reimaging optics.

The efficiency of the array creation can be defined as $\varepsilon=I_t/I_d$ where $I_t$ is the peak intensity of an output beam and $I_d=P/d^2$ is the input intensity with power P per d×d unit cell. The peak intensity may then be written as:

$$I_t = .84\frac{P\frac{\pi\alpha^2}{d^2}}{\pi\alpha^2} \times 1.978 = 1.66 I_d; \tag{4}$$

SO ε=1.66, independent of the value of a.

Figure 4C:
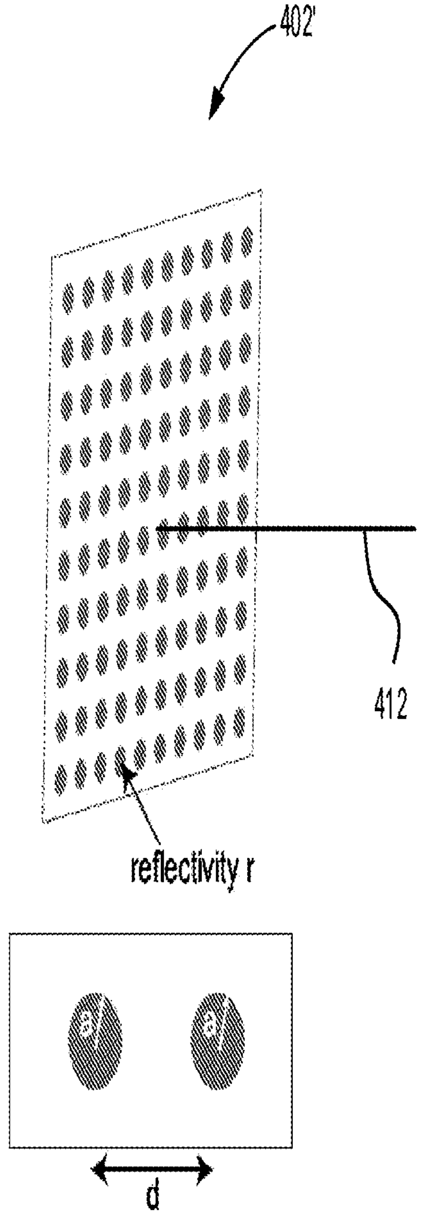
FIG. 4C is an illustration of an example mask for use in the beam filter shown in FIG. 4B.

In some applications, such as quantum computation, an array of dark spots having Gaussian profiles may be desired for trapping particles at local minima of the optical intensity. As such, dark spots can be created by combining a broad input beam, or plane wave, and bright Gaussian beams having equal amplitudes and n phase difference to create a field zero from destructive interference. To do so, the first mask 402 of the beam filter 104 shown in FIG. 4B may be replaced with a modified first mask 402' having an array of reflecting spots with radius a, and which is otherwise fully transmitting, as shown in FIG. 4C. In some embodiments, the modified first mask 402' may be formed using a transparent substrate, and an array of partially or fully reflecting regions (e.g. circular spots), as described with reference to FIG. 3B.

Particularly with reference to FIG. 4B, the light field transmitted through the modified first mask 402' may be written as:

$$E = E_d - r\sum_{ij} E_{ij}; \tag{5}$$

where Ed is the amplitude of the plane wave incident on the modified first mask 402', $E_{ij}$ is the light field transmitted by $ij^{th}$ aperture, and r is the reflectivity of each spot. The plane wave, which may be much broader than the field of a single aperture, will be fully transmitted through the modified first mask 402', and beam filter 104. Therefore the field at the output plane will be:

$$E_2 = -E_d - r\sum_{ij} E_{2,ij}; \tag{6}$$

where $E_{2,ij}$ is the field of Eq. (1) centered at position $-\rho_{ij}$ in the output plane. Choosing $r=1/\sqrt{1.66}=0.78$ there will be a zero in the field at $-\rho_{ij}$ surrounded by an intensity pattern with a Gaussian profile. The efficiency may then be given by:

$$\varepsilon = \frac{I_t}{I_d} = \frac{I_d}{I_d} = 1. \tag{7}$$

This efficiency is somewhat lower than the one obtained for an array of bright spots, as described above. Nevertheless, both efficiencies compare favorably with conventional methods. Specifically, darks spots created previously with a Gaussian beam array using diffractive optical elements have ε≤0.51, and a line array has ε≤0.97. By contrast, the present Fourier filtering approach provides substantially better efficiency than a line array since the diffractive multi-spot gratings used to prepare such arrays have efficiencies ~0.75. In part, this is because beam shapers providing uniform illumination (e.g. top hat beam shaper) can have near 100% efficiency.

In particle or atom trapping, important parameters are the depth of the trap, which is proportional to $l_t$, and the spatial localization. When the trapped particles have motional energy that is small compared to the depth of the trapping potential, the degree of localization is governed by the quadratic variation of the intensity near the trap center. For a bright trap, which localizes a particle near the intensity maxima, the trapping potential can be written as $$U=U_0(1-\alpha_\perp\rho^2-\alpha_\square Z^2+\ldots). \quad (8).$$

Here ρ is the radial coordinate and z is the axial coordinate along the trap axis. For a particle with motional temperature T, the virial theorem gives:

$$2U_0\alpha_\perp\langle\rho^2\rangle = 2k_BT \quad (9)$$

$$2U_0\alpha_\square\langle z^2\rangle = k_BT;$$

where $k_B$ is the Boltzmann constant. The standard deviations of the particle position are therefore, $$\sigma_\rho\sqrt{\langle\rho^2\rangle} = \frac{1}{\alpha_\perp^{1/2}}\left(\frac{k_BT}{U_0}\right)^{1/2}, \quad (10)$$

$$\sigma_Z = \sqrt{\langle z^2\rangle} = \frac{1}{(2\alpha_\square)^{1/2}}\left(\frac{k_BT}{U_0}\right)^{1/2}.$$

For an ideal Gaussian beam with waist parameter $w_G$, and optical wavelength λ, one can have $$\alpha_\perp = 2/\omega_G^2 \quad (11)$$

$$\alpha_\square = \frac{\lambda^2}{\pi^2\omega_G^4}.$$

Equation 10 may then be written as $$\frac{\sigma_\rho}{\left(\frac{k_BT}{U_0}\right)^{1/2}} \equiv \tilde{\sigma}_\rho = \frac{\omega_G}{\sqrt{2}}, \quad (12)$$

$$\frac{\sigma_z}{\left(\frac{k_BT}{U_0}\right)^{1/2}} \equiv \tilde{\sigma}_Z = \frac{\pi\omega_G^2}{\sqrt{2}\lambda}.$$

For Airy-Gauss beam, $w_G$=0.974a, giving position deviations $$\tilde{\sigma}_\rho = 0.69\alpha, \quad (13)$$

$$\tilde{\sigma}_Z = 2.1\frac{\alpha^2}{\lambda}.$$

Using α=d/3, the position factors can be written as $$\tilde{\sigma}_\rho = 0.23d, \quad (14)$$

$$\tilde{\sigma}_Z = 0.233\frac{d^2}{\lambda}.$$

Equations 12 and 14 give the position spreads for bright optical traps. For a dark optical trap created by interfering a Gaussian beam with a plane wave, the axial profile far from the origin is different than that of a bright trap due to the variation of the field phase with z, given by $$\phi(z) = \tan^{-1}\left[z/\left(\pi\omega_G^2/\lambda\right)\right]. \quad (15)$$

Figure 6:
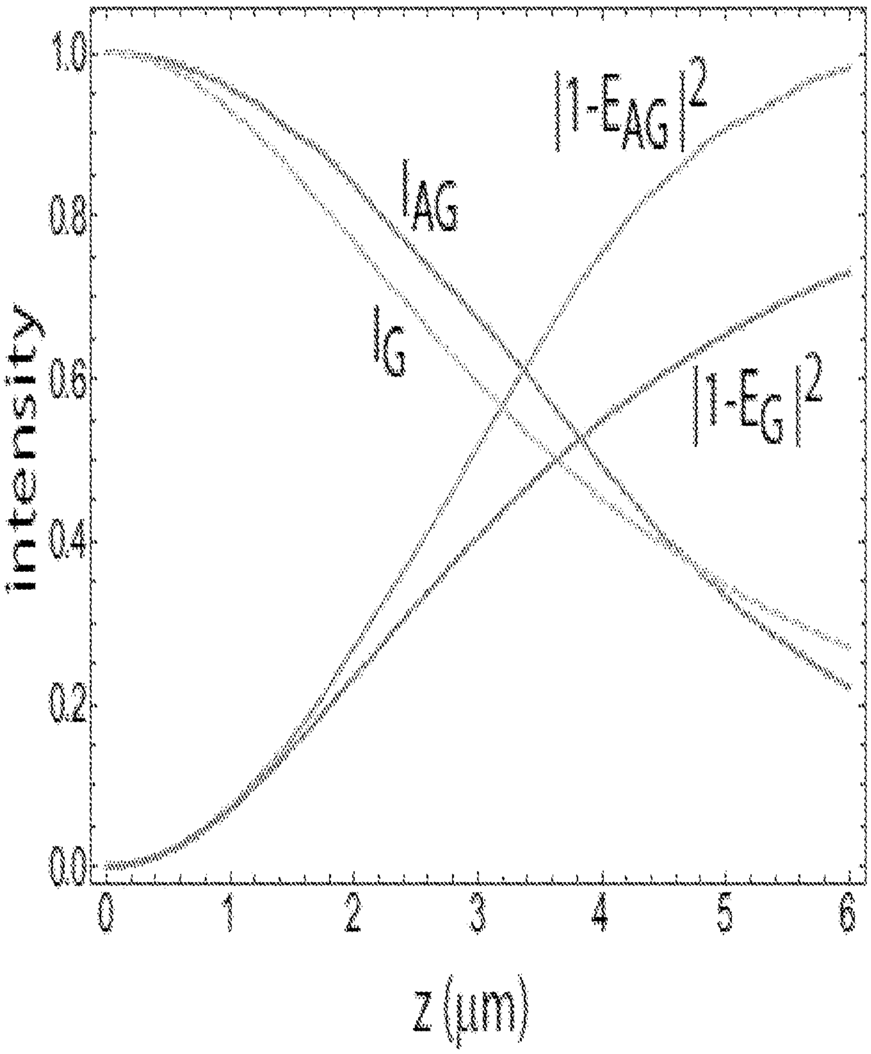
FIG. 6 is a graph comparing on-axis intensity as a function of axial coordinate z computed by Fresnel diffraction for a Gaussian beam, ($I_G$), an Airy-Gauss beam ($I_{AG}$), a dark Airy-Gauss beam ($|1-E_{AG}|^2$), and a dark Gaussian beam ($|1\text{-EG}|^2$).

This is illustrated in FIG. 5. Note that the axial profiles are somewhat different for Airy-Gauss and Gaussian beams. Nevertheless the leading quadratic terms are unchanged so the localization parameters are still given by Eqs. 12 and 14. These results can be compared with prior approaches for the Gaussian line array. There the optimum localization is obtained for $\tilde{\sigma}_\rho$=0.42d and $\tilde{\sigma}_z$=0.30d²/λ. By contrast, the present approach has a 45% better transverse localization and 22% better axial localization. Specifically, as shown in FIG. 6, the localization obtained is off $\tilde{\sigma}\rho$=0.69 μm and $\tilde{\sigma}_z$=2.6 μm. Parameters used for numerical calculations included a=b=1.0 μm, λ=0.825 μm,f=2 μm and $w_G$=0.974a. With a temperature to trap depth ratio of less than a factor of 9, which is standard for atoms in optical traps, this implies sub-micron localization in all dimensions.

Figure 7:
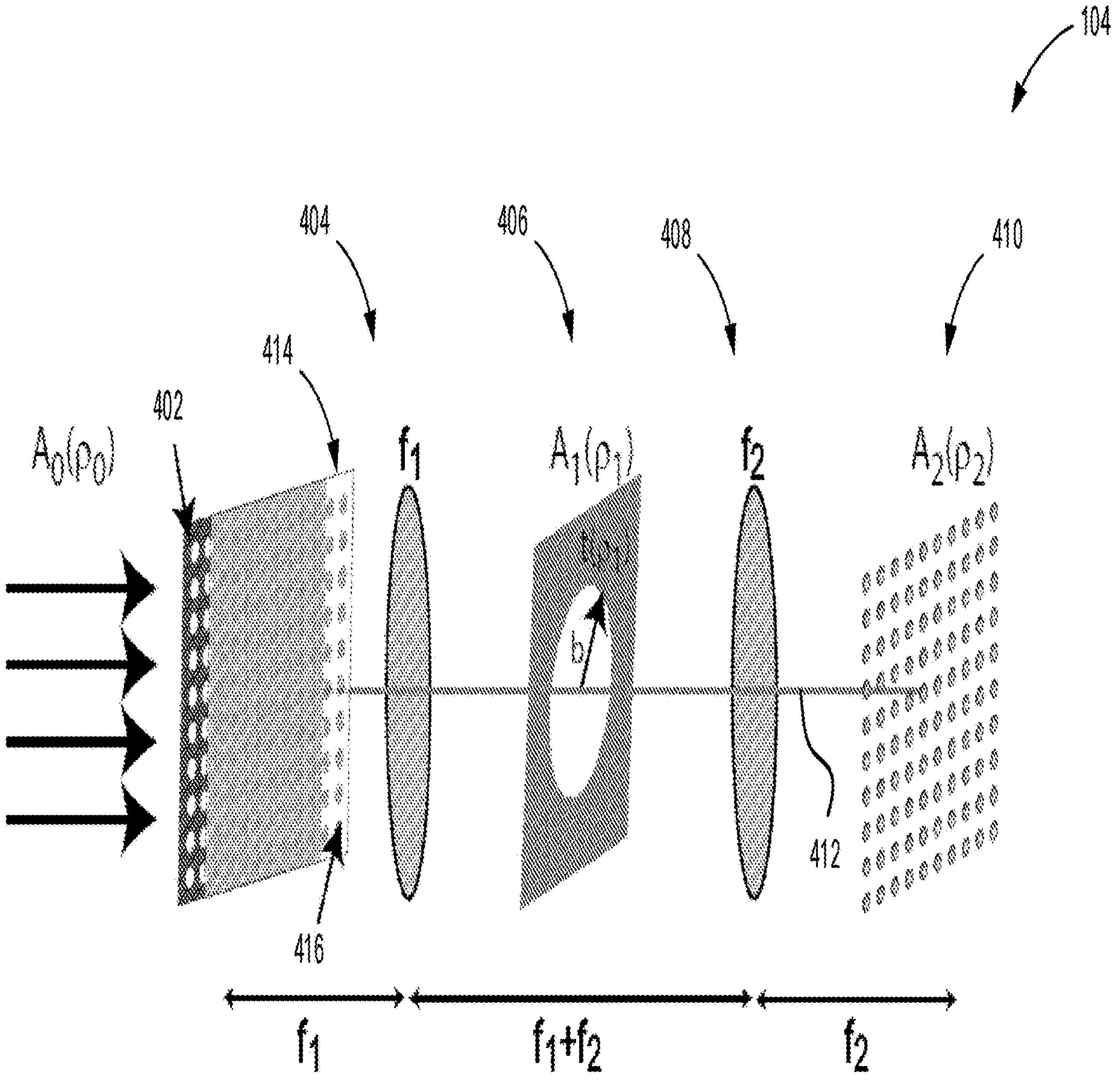
FIG. 7. is an illustration of yet another example beam filter, in accordance with aspects of the present disclosure.

The Fourier filtering approach described herein, whether used to create an array of bright or dark traps, may lead to formation of multiple trapping planes due to the Talbot effect. Should such planes be undesired, a variation to the configuration of FIG. 4B may be utilized, as shown in FIG. 7. Specifically, a phase scrambling mask 414 may be positioned between the first mask 402 and first lens 404. As shown, the phase scrambling mask 414 may include an array of scrambling regions 416 positioned at $\rho_{ij}$, each providing full transmission of light passing therethrough, along with a phase shift $\varphi_{ij}$. In some aspects, the phase shift $\varphi_{ij}$ for each scrambling region 416 may vary between 0 and 2n, and be randomly distributed across the phase scrambling mask 414.

Figure 8:
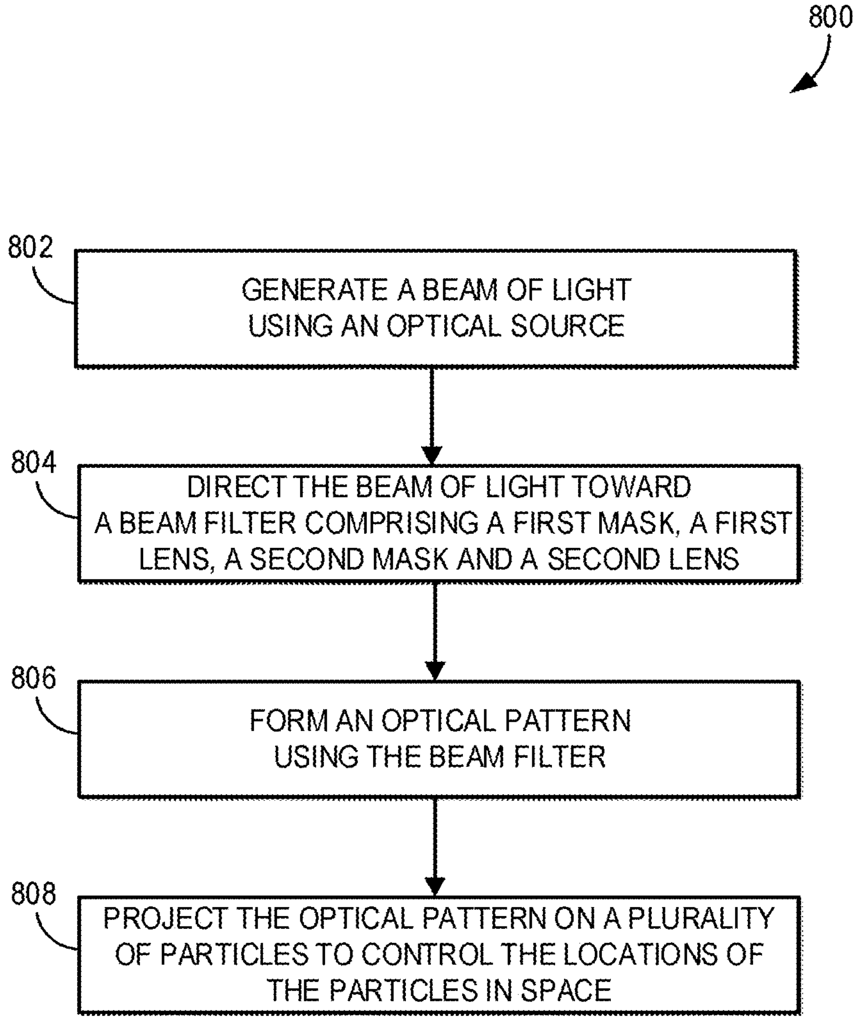
FIG. 8 is a flowchart setting forth steps of a process, in accordance with the present disclosure.

Turning now to FIG. 8, steps of a process 800 for controlling particles using projected light, in accordance with the present disclosure, are provided. In some implementations, steps of the process 800 may be carried out using systems described herein, as well as other suitable systems or devices.

The process 800 may begin at process block 802 with generating a beam of light using an optical source. As described, the light beam generated by the optical source may have a variety of properties, including various frequencies, wavelengths, power levels, spatial profiles, temporal modulations, and so on. In some aspects, the light beam may have frequencies shifted from at least one atomic resonance of particles to be trapped.

The beam of light may then be directed to a beam filter, as indicated by process block 804. In accordance with aspects of the present disclosure, the beam filter may include a first mask, a first lens, a second mask and a second lens. In some variations, the beam filter may further include a third mask positioned between the first mask and the first lens, where the third mask may include a phase scrambling mask. The beam filter may be configured such that the beam of light passes sequentially through the first mask, optionally the third mask, the first lens, the second mask, and second lens, and thereafter exists the beam filter to form an optical pattern, as indicated by process block 806. As described, the optical pattern may have a variety of configurations depending on the particular application.

The optical pattern may then be projected on a plurality of particles (e.g. atomic particles) to control their locations in space, as indicated by process block 808. To this end, the particles may be provided by a particle system that is configured to generate and confine them to a particular volume or a general location in space. As described, the provided particles can be held in a vacuum and cooled to temperatures suitable for optical trapping.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for controlling a plurality of particles using projected light, the system comprising:

an optical source configured to generate a beam of light with a frequency shifted from an atomic resonance of the plurality of particles; and a beam filter positioned between the optical source and the plurality of particles, the beam filter including a first mask and a first lens, the beam of light passing from the optical source through the beam filter to the plurality of particles and being projected on the plurality of particles in an optical pattern.

2. The system of claim 1, wherein the first lens has a first focal length, the first mask being the first focal length away from the first lens.

3. The system of claim 1, wherein the beam filter includes a second mask and a second lens having a second focal length, the second mask being a first focal length away from the first lens and the second focal length away from the second lens, the first lens having the first focal length.

4. The system of claim 3, wherein the beam of light passes sequentially through the first mask, the first lens, the second mask, and the second lens.

5. The system of claim 3, wherein the beam filter further includes a third mask positioned between the first mask and the first lens.

6. The system of claim 1, wherein the first mask includes a reflecting plane formed using a substrate coated with a reflective layer.

7. The system of claim 6, wherein the reflective layer includes at least one transmitting region producing at least one bright region in the optical pattern.

8. The system of claim 6, wherein the reflective layer comprises at least one reflecting region producing at least one dark region in the optical pattern.

9. The system of claim 1, where the plurality of particles includes a plurality of neutral atoms.

10. The system of claim 1, wherein the beam of light has the frequency shifted from the atomic resonance to achieve a blue detuning or a red detuning.

11. The system of claim 1, wherein the beam filter is further configured to transform a Gaussian beam or a near-Gaussian beam into a beam with a uniform intensity profile.

12. A method for controlling particles using projected light, the method comprising:

generating a beam of light using an optical source;

directing the beam of light through a beam filter including a first mask and a first lens to form an optical pattern; and projecting the optical pattern on a plurality of particles to control their locations in space.

13. The method of claim 12, wherein the first lens has a first focal length, the first mask being the first focal length away from the first lens.

14. The method of claim 13, wherein the beam filter includes a second mask and a second lens having a second focal length, the second mask being the first focal length away from the first lens and the second focal length away from the second lens, the first lens having the first focal length.

15. The method of claim 14, wherein the beam of light passes sequentially through the first mask, the first lens, the second mask, and the second lens.

16. The method of claim 14, wherein the beam filter further includes a third mask positioned between the first mask and the first lens.

17. The method of claim 12, wherein the first mask includes a reflecting plane formed using a substrate coated with a reflective layer.

18. The method of claim 17, wherein the reflective layer includes at least one transmitting region producing at least one bright region in the optical pattern.

19. The method of claim 17, wherein the reflective layer includes at least one reflecting region producing at least one dark region in the optical pattern.

20. The method of claim 12, where the plurality of particles includes a plurality of neutral atoms.

* * * * *